E. H. ANGIER.
MEANS FOR MAKING COMPOSITE SHEET MATERIAL.
APPLICATION FILED SEPT. 19, 1907.

997,173.

Patented July 4, 1911.

3 SHEETS—SHEET 1.

Witnesses:
Horace A. Crossman
Edwin T. Luce

Inventor:
Edward H. Angier.
by Emery & Booth, Attys.

E. H. ANGIER.
MEANS FOR MAKING COMPOSITE SHEET MATERIAL.
APPLICATION FILED SEPT. 19, 1907.
997,173.
Patented July 4, 1911.
3 SHEETS—SHEET 2.
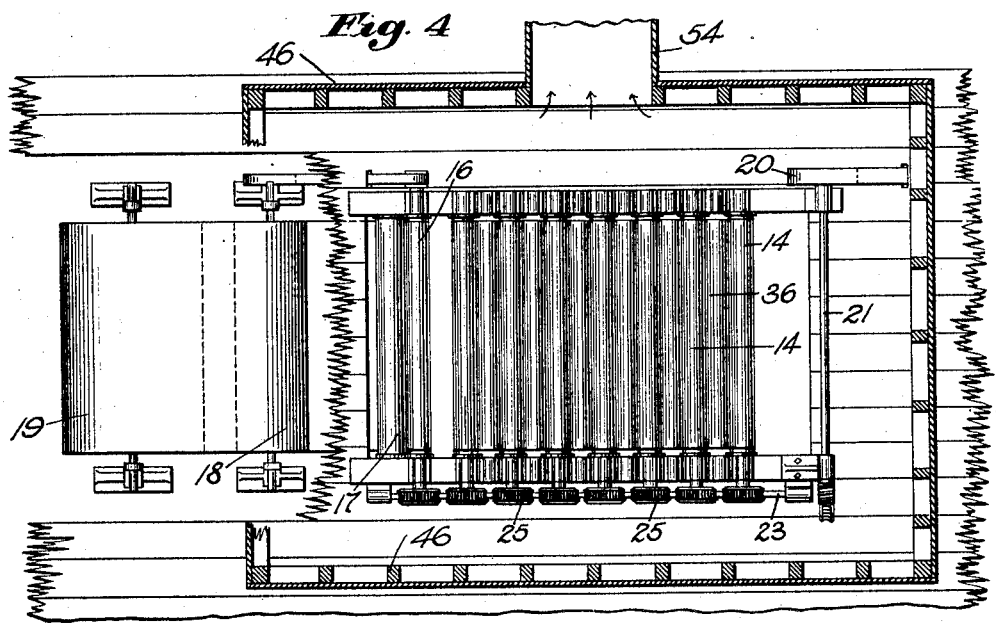
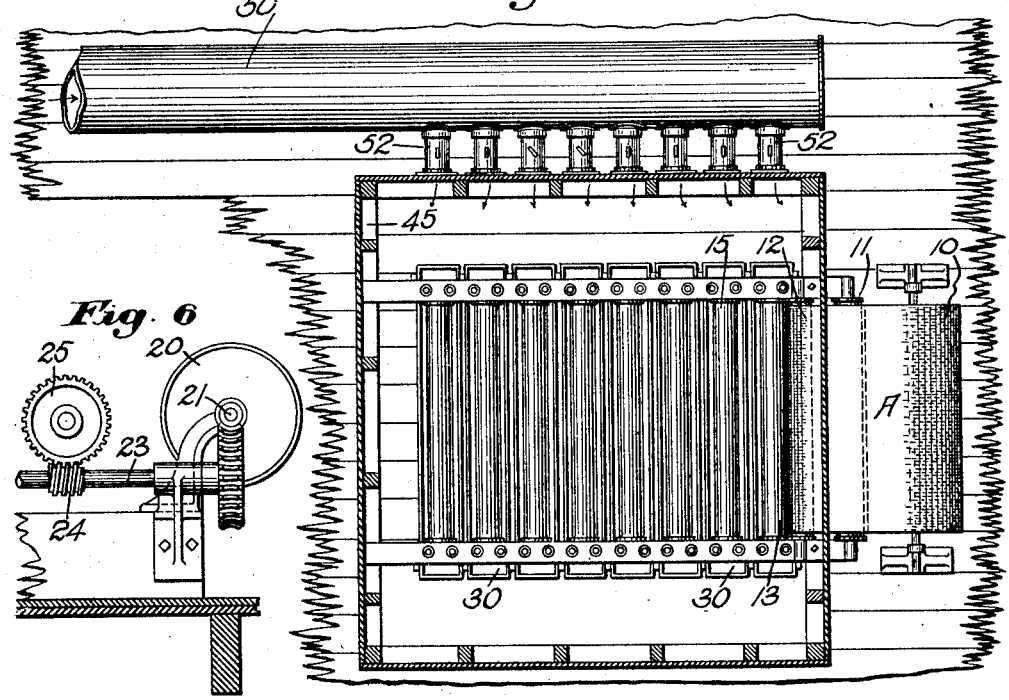
Witnesses:
Horace H. Crossman
Edwin P. Luse
Inventor:
Edward H. Angier.
by Emery & Booth
Attys E. H. ANGIER.
MEANS FOR MAKING COMPOSITE SHEET MATERIAL.
APPLICATION FILED SEPT. 19, 1907.
997,173.
Patented July 4, 1911.
3 SHEETS—SHEET 3.
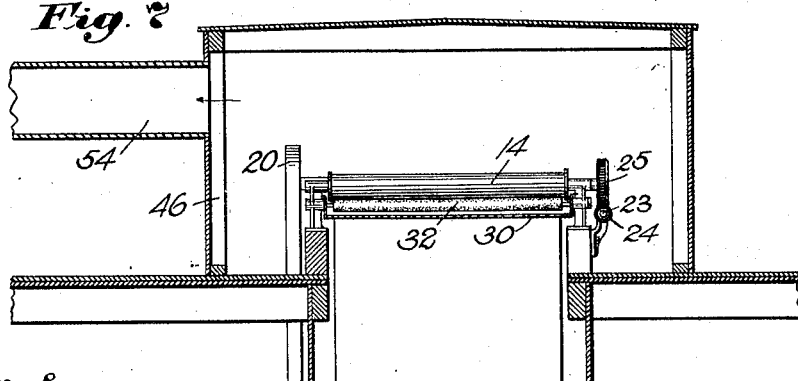
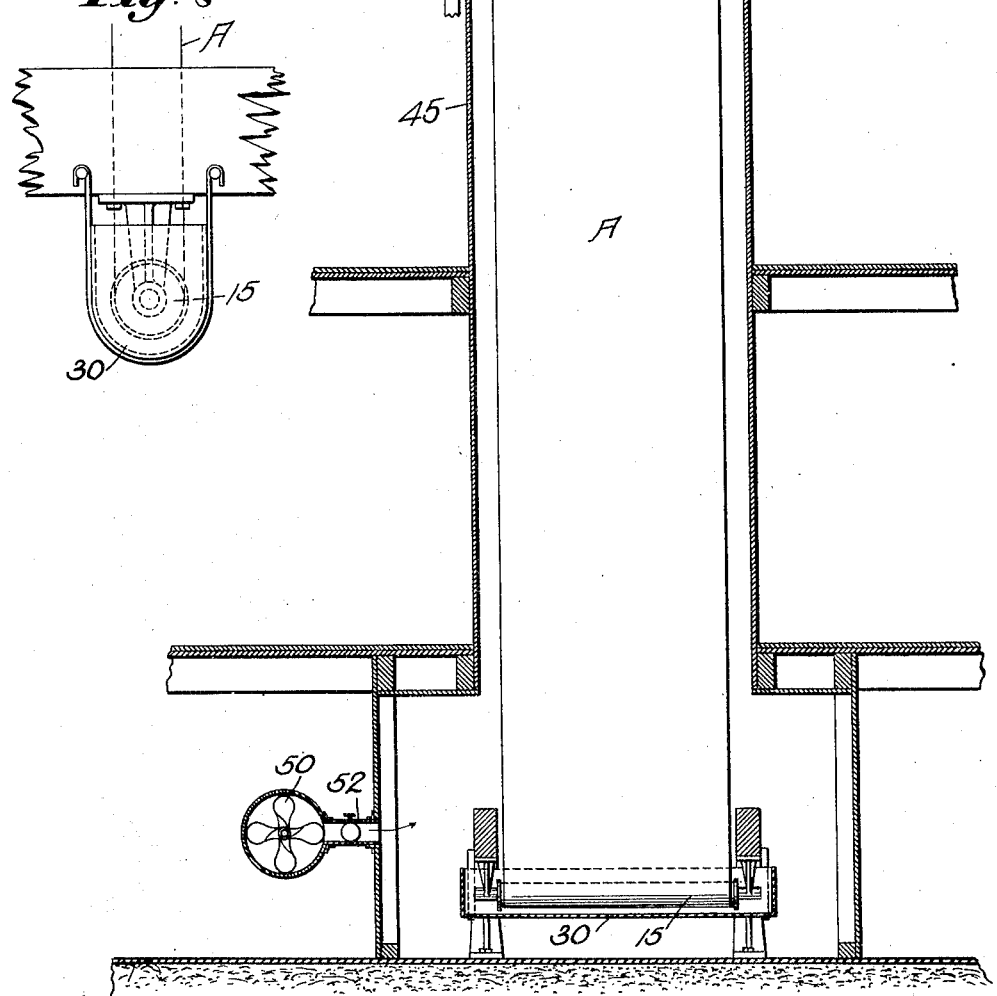
Witnesses:
Horace H. Croisman
Edwin P. Luce
Inventor:
Edward H. Angier
by Emery & Booth, Attys

UNITED STATES PATENT OFFICE.

EDWARD H. ANGIER, OF QUINCY, MASSACHUSETTS.

MEANS FOR MAKING COMPOSITE SHEET MATERIAL.

997,173.

Specification of Letters Patent.   Patented July 4, 1911.

Application filed September 19, 1907.   Serial No. 393,750.

*To all whom it may concern:*

Be it known that I, EDWARD H. ANGIER, a citizen of the United States, and a resident of Quincy, in the county of Norfolk and Commonwealth of Massachusetts, have invented an Improvement in Means for Making Composite Sheet Material, of which the following description, in connection with the accompanying drawings, is a specification, like letters on the drawings representing like parts.

This invention relates to apparatus for making composite sheet material and the like, such, for example, as sheet material consisting of a wire fabric filled or coated with a translucent filler.

The invention consists in various features whereby composite sheet material of uniform quality and characteristics may be made rapidly and may be delivered in convenient form for handling and transportation.

The character of the invention may be best understood by reference to the accompanying drawings which show an illustrative embodiment of the invention.

Figure 1:
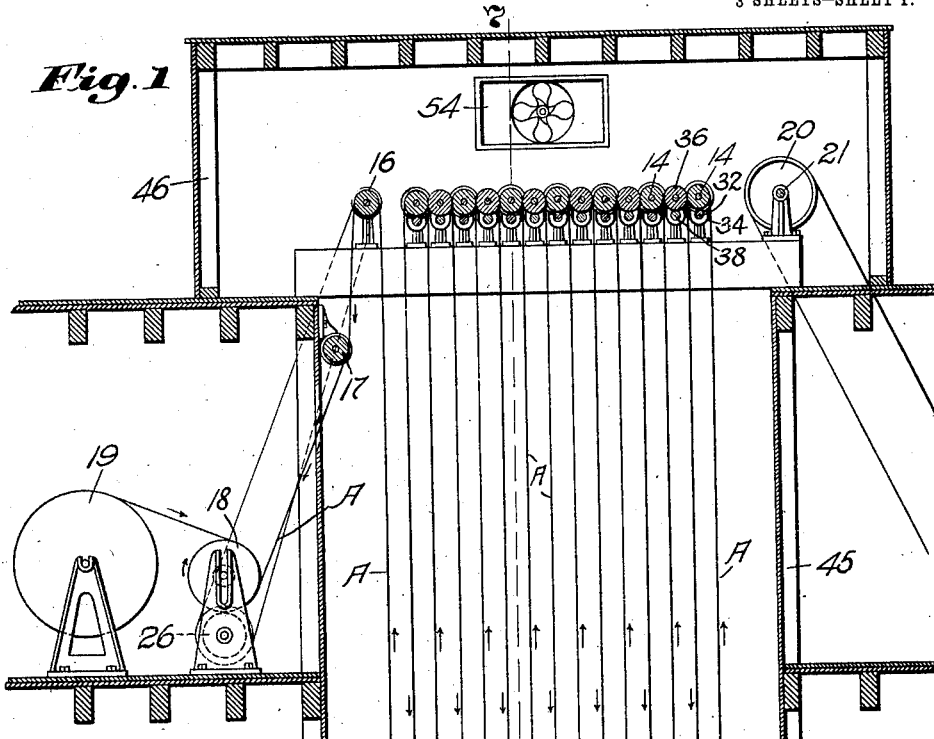
Figure 2:
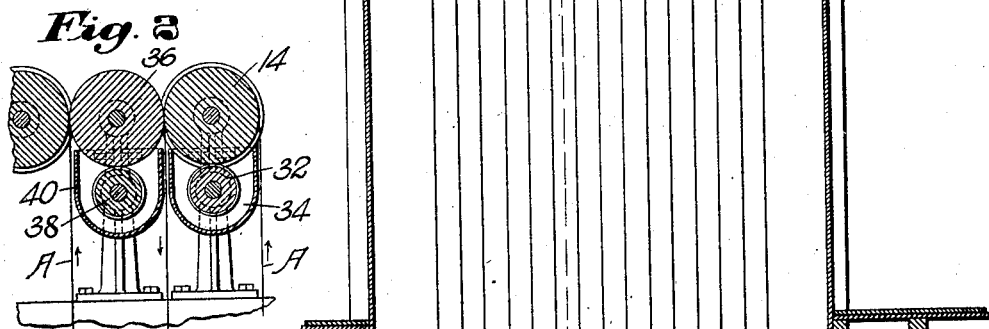
Figure 3:
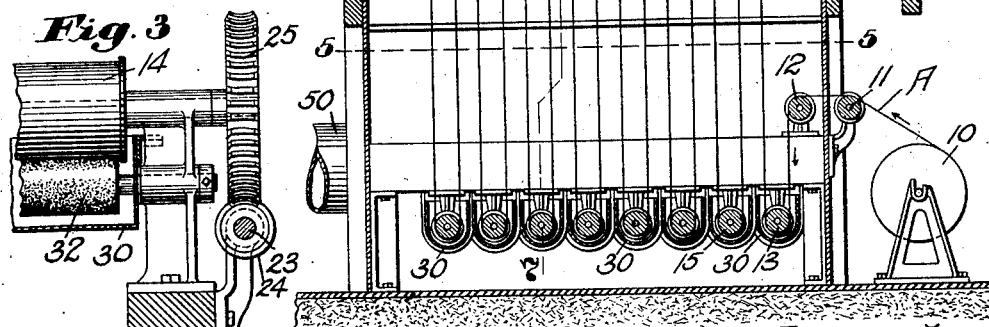

In the drawings: Figure 1 is a side elevation (partly in section on a line 1—1 of Fig. 4) of means for presenting wire fabric or other base substance to receive applications of filler or the like; Figs. 2 and 3, details of certain parts shown in Fig. 1; Fig. 4, a top plan view of the parts shown in Fig. 1 with the inclosing housing omitted; Fig. 5, a horizontal section on the line 5—5 of Fig. 1, looking downward at a set of rolls shown at the bottom of Fig. 1; Fig. 6 a detail of certain parts shown at the top of Fig. 1; Fig. 7, an end elevation of the mechanism shown in Fig. 1, partly in section on the line 7—7 of Fig. 1; and Fig. 8 is a detail of one of the rolls and tanks shown at the bottom of Fig. 1.

Referring now to Fig. 1, the wire screen or fabric, perforated sheet metal, or other suitable fabric or material constituting the base substance, conveniently so called, may be supplied in a roll 10, from which it may be unwound as desired to have the translucent or other filling substance or filler applied to it. From the roll 10 the base substance A may be conducted in any practicable manner, as by passing it over guide rollers 11 and 12, to a convenient position for receiving an application of the filler. In the specific illustration the base substance A passes from a roller 12 to and beneath a roller 13 and then upwardly through a preferably long run to and over a roller 14. Thence, through another long run, the base substance moves downwardly to and under a roll 15 and thence upwardly again. There may be as many such runs of the base fabric as desired and preferably the runs are alternately upwardly and downwardly moving. From conveniently located guide rolls 16 and 17 the base substance (which may then have the filler completely applied to it) passes to a suitable receiver, such as a take-up 18. The latter may be of a well-known type, arranged preferably to have a uniform peripheral speed by having the take-up roll 18 rest upon and driven by peripheral friction from a suitable drum therebeneath. If desired a layer or layers of paper or the like may be introduced against a face of the sheet material as it is wound onto the take-up; and for this purpose it is convenient to have a roll 19 of the paper. Preferably corrugated paper or the like is used for this purpose, since it not only serves to separate the spiral layers of the composite sheet material but it may also cushion said layers and, by being wound tightly, it may supply a solid though slightly elastic roll suitable to protect the sheet material in transportation.

In order that the base substance may be fed along from its source at the roll 10 to the receiver or take-up 18, one or more of the rolls may be power driven. For example, the rolls 14—14 may be driven through a belt pulley 20 (Fig. 1) on a shaft 21, having a worm (Fig. 6) to mesh with a worm gear on a shaft 23 extending transversely of the shafts of the rolls 14. The shaft 23 has a worm 24 to mesh with a worm gear 25 on each of the roll shafts. The base substance may, however, be fed in any practicable manner. On the shaft of the top roll 16 is a pulley belted to the driving drum 26 of the take-up.

In a preferred use of the above described mechanism the base substance is taken from the roll 10 and fed slowly in the direction of the arrows in Fig. 1, in a continuous length. During its travel, it receives one or more applications of the filler. For example, as the base substance passes around the initial bottom roll 13, it may be immersed in a bath of the filler contained in a tank 30 (Figs. 1 and 8). Each of the lower rolls 13, 15, etc., may have an individual tank or other means for applying the filler so that the latter may be applied to the base substance at a succession of points in its travel. If desired, all of the lower rolls 13, 15, etc., may be located in a single tank. It is preferred, however, that one of said rolls have applying means separate from the others, in order that partially completed composite sheet material may receive a coating or finishing material of different character from that employed in the earlier stages of the operation. In addition to the baths or applications of filler at the bottom of the structure, the base substance may have filler applied to it at other points, as, for example, adjacent the upper rolls 14—14, etc. To illustrate, one or more of the rolls 14 (Fig. 2) may contact with a doctor roll 32 in a tank 34. Said tank may contain a supply of filler which will be lifted by the doctor roll 32 and applied to the surface of the roll 14, to be transferred therefrom to the base substance. It is understood, of course, that any application of filler after the first may find the base substance completely covered so that the filler would then be applied not directly to the base substance but to partially completed composite sheet material. With this understanding, however, it is convenient to refer to successive applications as being made to the base substance.

With the specific arrangement shown in the drawings a doctor roll 32 and its cooperating roll 14 would apply filler to only one face of the base substance, the other side of which may be coated simultaneously by a roll 36, contacting with a second doctor roll 38 in a tank 40 containing filler. Thus, the base substance, or, as explained, the partially completed composite sheet material, may pass in the direction of the arrows up over a roll 14 and downwardly between the latter and a roll 36, receiving upon both faces from the respective rolls applications of the filler.

The rolls and the successive runs of the base substance are preferably inclosed in a housing 45, terminating at its top in a monitor 46, from which the progress of the work at the top may be inspected. The housing 45 may extend from a basement or lower floor through a number of floors in a factory building, so that the runs of the base substance or of the partially completed composite sheet material may be, if desired, of considerable length. To assist in drying the filler, a draft of air preferably passes through the housing 45. This purpose may be promoted by heating the interior of the housing 45 above normal temperature. For example, a warm air pipe 50 communicates, preferably by a number of ports 52, with the interior of the housing 45; and the top part of the housing, as, for example, the monitor 46, has an outlet port 54. A draft of air from the pipe 50 to the outlet 54 may be created in any practicable manner, as by a blower in one or the other of the pipes. The described arrangement is purely illustrative, and air may be introduced to the housing at any suitable point and the outlet may be located in any practicable relation thereto.

In using the above described apparatus it is preferred that one application of filler to the base substance or partially completed composite sheet material be made before or during movement of the latter in one direction; and that a subsequent application be made before or during movement of the latter in the opposite direction, the result being to compensate for inequalities in coating as presently described. As represented in Fig. 1, the first application of filler takes place just before and at the beginning of upward movement of the base substance; and the next takes place as the base substance is about to move downwardly. The sequence of these movements is immaterial, however, and it is not indispensable that immediately successive applications act upon oppositely moving runs of the base substance.

When the base substance moves upwardly after an application of the filler, (for example, as the base substance emerges from the bath in a tank 30) it may carry upwardly with it more of the filler than will at once adhere to it, some of which may flow downwardly over the freshly filled area, tending to lodge and accumulate at the lowermost edge of each mesh or aperture of the base substance, being there arrested or detained by the wire weft or other boundary wall of a mesh or aperture. At the same time the filler may tend to flow downwardly and away from beneath the uppermost edges of the apertures, with the result that the web of filler in each mesh or aperture may be thin (or possibly entirely lacking) at the upper part of the mesh, and thick at the lower part. If the filler partially sets or hardens in this condition the surface of the material will be left rough and uneven. A number of applications of filler, the base substance moving upwardly at each application, may serve to remove for all practical purposes this lack of uniformity, since successive fillings may so coat the faces of the composite material as practically to eliminate the effect of the wire weft or other aperture boundary as regards detaining or arresting the downwardly flowing filler. The unevenness referred to may be effectively removed, however, by inverting the partially filled base substance and applying filler while it occupies this inverted position. This may be effected, as illustrated in the drawings, by moving the base substance upwardly after one application and downwardly after the next. With this arrangement, when the base substance reaches the second application its meshes are unevenly filled; with their thinnest fillings uppermost; but when the substance turns and begins to move downwardly the thinnest filling is lowermost. Hence filler applied at this time may flow downwardly and accumulate adjacent the thinly filled points, so as practically to compensate for the unevenness. This automatic reversal may be repeated as often as desired. Preferably, the filling applied at one point is permitted to dry before the next application is made and the runs of the base substance may be made as long as desired, to suit this purpose, or the drying may be promoted by air drafts, which preferably will be heated.

If the base substance be moved past a point of application of filler, some of the filler may adhere to it and some flow downwardly as already described. Thus, throughout the movement of the base substance considerable amounts of filler will be flowing backwardly over recently filled areas, and may serve to produce a thicker covering than that heretofore supplied by merely dipping a sheet of base substance in a bath of filler and then withdrawing it. The surplus filler flowing back to meet the newly filled areas may thus serve as a sort of supplemental bath.

The above described apparatus serves merely to illustrate a single manner in which this invention may be practiced, and it is to be understood that the invention is not essentially limited to the construction and method shown and described. Moreover, it is by no means essential that all the features of the invention be used conjointly, since they may be employed to advantage separately. For example, the applications of filler which are shown as made at the tops of the runs of base substance, as the latter passes over the rolls 14—14, may be dispensed with if desired.

No attempt has been made hereinbefore to define the scope of the invention, this office being delegated exclusively to the subjoined claims.

Claims:

1. Apparatus of the character described having, in combination, a plurality of guides to present a continuous length of the apertured base substance in different planes extending substantially upwardly and downwardly; means to feed the base substance to cause it to move over said guides substantially upwardly and downwardly; filler-supplying means to supply filler to both sides of the base substance moving in one direction whereby a portion of the filler accumulates at the then lowermost parts of the apertures in the base substance; and filler supplying means to supply filler to both sides of the base substance moving in a different direction whereby a portion of the filler accumulates at other parts of the apertures in the base substance, tending to compensate for the uneven accumulation following the first mentioned application of filler.

2. Apparatus of the character described, having, in combination, a plurality of guides to position the apertured base substance; means to move the base substance substantially upwardly and downwardly; filler supplying means to supply filler to the base substance moving in one direction whereby a portion of the filler accumulates at the then lowermost parts of the apertures in the base substance; and filler supplying means to supply filler to the base substance moving in a different direction whereby a portion of the filler accumulates at other parts of the apertures in the base substance, tending to compensate for the uneven accumulation following the first mentioned application of filler.

3. Apparatus of the character described having, in combination, a plurality of guides for the apertured base substance; filler supplying means; means relatively to move the base substance and filler supplying means in one direction whereby a portion of the filler accumulates at the then lowermost parts of the apertures in the base substance, and in a different direction whereby a portion of the filler accumulates at other parts of the apertures in the base substance, tending to compensate for the uneven accumulation following the first mentioned application of filler.

4. Apparatus of the character described having, in combination, means to feed the apertured base substance in different directions substantially upwardly and downwardly; means to apply the filler to the base substance as the latter moves upwardly, whereby the coating of filler is uniformly thickened adjacent the lower extremities of the apertures in the base substance; and means to apply the filler to the base substance as the latter moves downwardly, whereby the filler supplements that previously applied and tends to fill in uniformly the thinly filled areas.

In testimony whereof, I have signed my name to this specification, in the presence of two subscribing witnesses.

EDWARD H. ANGIER.

Witnesses:
ARTHUR E. CARSON,
FREDERICK L. EMERY.